United States Patent [19]

Leonard

[11] 3,723,859
[45] Mar. 27, 1973

[54] TESTING APPARATUS HAVING IMPROVED MEANS FOR MEASURING PERMEABILITY AND SPECIFIC LOSS IN A MOVING STRIP OF METAL

[75] Inventor: Stephen C. Leonard, Cheshire, Mass.

[73] Assignee: General Electric Company

[22] Filed: July 6, 1971

[21] Appl. No.: 159,938

[52] U.S. Cl. .................................................324/34 R
[51] Int. Cl. .............................................G01r 33/12
[58] Field of Search ..................324/34 R, 34 TK, 40; 340/173 CA

[56] References Cited

UNITED STATES PATENTS

| | | | |
|---|---|---|---|
| 2,861,241 | 11/1958 | Leonard et al. | 324/34 R |
| 2,951,984 | 9/1960 | Zoltan | 324/34 R |
| 3,172,036 | 3/1965 | Walters | 324/1 |
| 3,281,678 | 10/1966 | Cilyo | 324/34 R |

FOREIGN PATENTS OR APPLICATIONS

| | | | |
|---|---|---|---|
| 824,773 | 12/1959 | Great Britain | 324/34 R |
| 971,706 | 10/1964 | Great Britain | 324/34 TK |
| 1,135,957 | 9/1962 | Germany | 340/173 CA |

Primary Examiner—Robert J. Corcoran
Attorney—J. Wesley Haubner, Albert S. Richardson, Frank L. Neuhauser, Oscar B. Waddell and Joseph B. Forman

[57] ABSTRACT

The monitoring and recording of steel characteristics in a continuously moving strip of steel is provided in a continuous strip tester system. The system includes a saturation thickness gauge at a first position and a loss and permeability gauge at a second position. A thickness indication produced by the saturation thickness gauge controls the flux density of the steel at the loss and permeability gauge through an automatic flux density control system.

7 Claims, 4 Drawing Figures

Patented March 27, 1973

INVENTOR
STEPHEN C. LEONARD

ATTORNEY

INVENTOR
STEPHEN C. LEONARD

ATTORNEY

INVENTOR
STEPHEN C. LEONARD

ATTORNEY

TESTING APPARATUS HAVING IMPROVED MEANS FOR MEASURING PERMEABILITY AND SPECIFIC LOSS IN A MOVING STRIP OF METAL

BACKGROUND OF THE INVENTION

1. Field of the Invention

The present invention relates to a system for continuously monitoring magnetic and non-magnetic material characteristics of a moving strip. While the invention hereinafter disclosed is perhaps of greatest interest in the determination of thickness, loss and permeability measurements of electric core steel, it will be obvious that the scope of the invention is not so limited.

2. Description of the Prior Art

In the past, methods of measuring the characteristics of a sheet of steel to determine the quality of the steel were through Epstein testing, or through the utilization of a rotating cylinder in the path of the traveling strip and the sensing of steel characteristics during each rotation.

Epstein testing called for determining the quality of electrical core steel by making measurements on a small four-legged core. In this type of measurement, steel strips must be cut, stacked and properly mounted prior to testing.

In a system utilizing a rotating cylinder, measurements of the quality characteristics, that is loss, permeability and thickness of a moving strip of steel were not made continuously throughout the strip.

The continuous strip steel tester herein disclosed provides for the continuous monitoring and recording of parameters in a moving strip of steel.

BRIEF SUMMARY OF THE INVENTION

The system as herein described includes a thickness or cross-sectional area measurement on a moving strip of steel at a first position, a loss and permeability measurement at the second position, and an automatic flux density control to establish a flux density at the second position equal to the flux density at the first position during the thickness measurement test for substantially the same section of the strip.

It is therefore an object of this invention to provide improved apparatus which will continuously measure and record the loss, permeability, and thickness of a moving strip of electrical core steel.

It is also an object of this invention to provide apparatus suitable for use by both steel manufacturers and users of electrical core steel as a non-destructive method of monitoring the quality of such steel prior to the sale thereof by the manufacturer and as an acceptance test by the user prior to cutting the steel strips into core laminations or the like.

Briefly stated, in accordance with one aspect of the invention, the foregoing objects are achieved by providing a thickness gauge at a first position which produces a first signal proportional to the cross-sectional area or thickness of a moving strip of steel, and using this signal to control the flux through an automatic flux density control system at a second position in a loss and permeability measuring gauge. The combination herein taught provides an accurate and reliable steel strip tester for a continuously moving strip of steel.

Other objects and advantages of the invention will become apparent to those skilled in the art upon reading the specifications in conjunction with the drawings in which:

DESCRIPTION OF AN EMBODIMENT OF THE INVENTION

Figure 1:
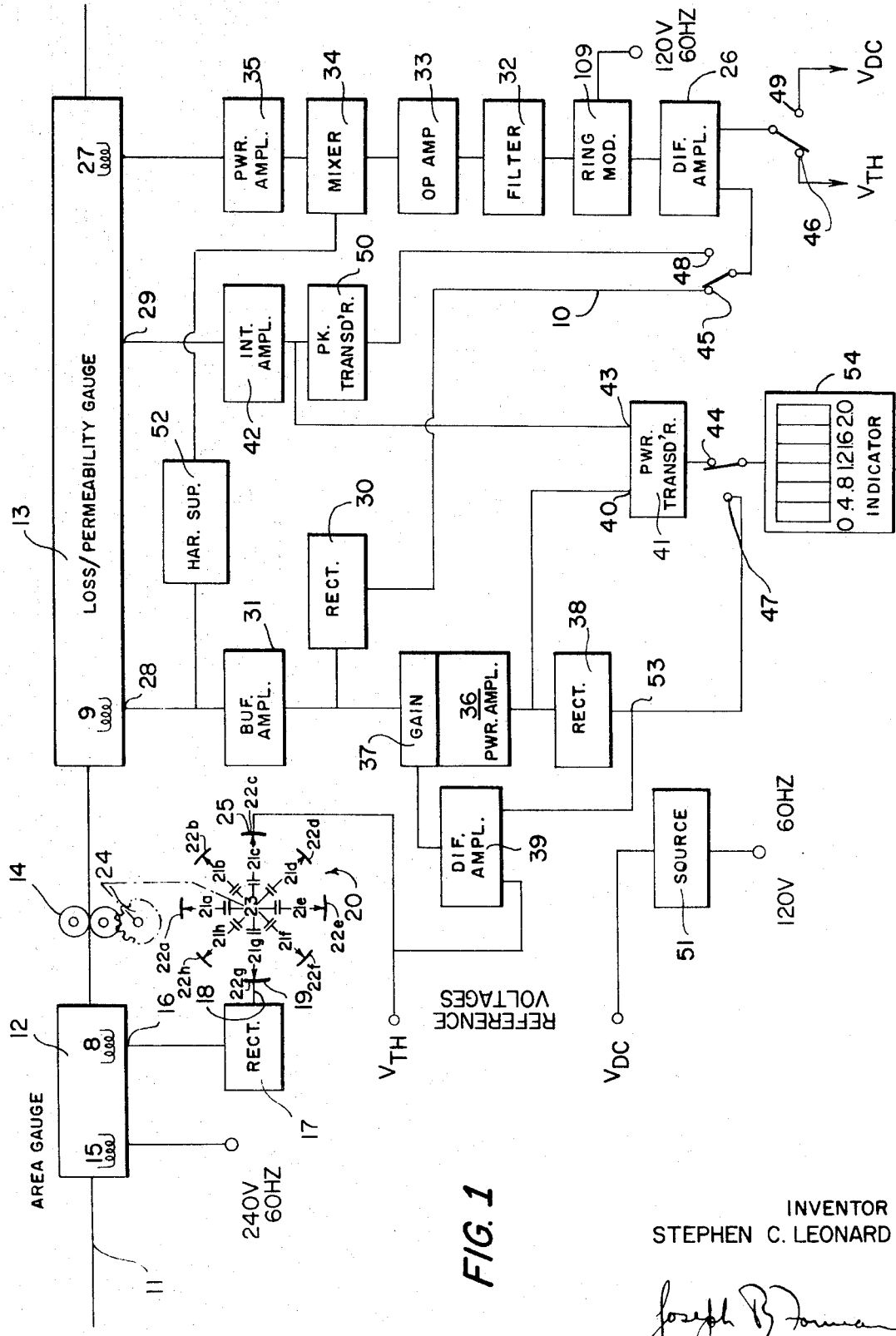
FIG. 1 is a block diagram of the continuous steel strip tester.

Referring now to FIG. 1, a continuous strip tester system is shown, wherein a moving strip of steel 11 passes through a first measurement gauge 12 and then through a second measuring gauge 13. The first measurement gauge 12 is located at a first position and the moving strip of steel 11 is driven by drive rolls 14 toward and through the second measuring gauge 13 at a second position.

The first measuring gauge may be of the type which is the subject of a co-pending application Ser. No. 159,940 filed by Stephen C. Leonard entitled "Saturation Thickness Gauge", on July 6, 1971 and assigned to the assignee of the present application.

The measurement gauge 12 the subject of the co-pending application provides that at saturation, with alternating flux through a first magnetizing means such as a first coil 15 excited from a 240 volt 60 hertz power supply an AC voltage 16 is induced in a first pickup means 8 in the saturation thickness gauge 12 which may be disposed about a strip of electrical core steel 11, and the AC voltage 16 will be proportional to the cross-sectional area of the strip 11. When the width of the strip of steel 11 is a constant, the voltage 16 will also be proportional to the thickness of the moving strip of steel 11 at the first position in the measurement gauge 12.

Voltage 16 is rectified in a precision rectifier 17, well known in the art, and forms a first signal 18 which is a DC representation of the cross-sectional area or thickness of moving strip 11 in the first position in the first measurement gauge 12.

The first signal 18 is received by an input contact 19 of an automatic flux density control means. The automatic flux density control means is of a type which is the subject of a co-pending application entitled "Automatic Flux Density Control" filed on July 6, 1971 by Stephen C. Leonard and M. D. Delick, application Ser. No. 159,849, and which application is assigned to the assignee of this application. The automatic flux density control means receives the first signal 18 and transfers the first signal 18 to input contact 19 to allow a rotatable make before break switch generally designated at 20 to charge one section of associated signal storage means designated as 21a through 21h to a level representative of the thickness or cross-sectional area of the moving strip 11 at the first position. The signal storage means 21a–21h are represented as each having a first connecting contact 22a through 22h respectively and a second connecting end 23, all of which are connected together at a common potential. Delaying means for delaying the first signal 18 for the amount of time it takes strip 11 to travel from the first position to the second position includes first connecting contacts 22, the multiple capacitors 21, or any other suitable device as taught in the above-mentioned co-pending application suitably to be rotatably connected through gear cluster 24 to be driven in time with drive rolls 14. The delaying means provides that the length of time it takes for substantially the same section of the moving strip 11 to travel between the center of the first measurement gauge 12 to the center of the second measurement gauge 13 will be the length of time it takes for the first signal 18 to be applied through an output contact 25 of the rotary make before break switch 20 and to a first input of a differential amplifier 26. This first signal 18 after it passes through the rotary make before break switch 20 and to a first input of differential amplifier 26 is still designated as first signal 18.

The second measurement gauge 13 is shown in FIG. 1 as a loss and permeability measuring gauge. The loss aspect is of the type taught in U.S. Pat. No. 2,861,241 entitled "Single Sheet Loss Tester" issued Nov. 1951 and invented by Stephen C. Leonard, Robert L. Ten Broeck, and Lewis R. Runaldue.

In general, the second measurement gauge 13 includes a second magnetizing means 27 which induces a flux in a section of the strip 11 at the second position; a second pickup means 9 which encircles the strip and develops a voltage 28 ($E_B$) representative of the actual amount of flux in the section of the strip 11 passing through the second measurement gauge 13; and a third means (not shown) which is a conventional "H" coil and develops a third signal 29 ($E_H$) which is representative of the time derivitive of current in the second magnetizing means 27. The second magnetizing means or coil 27 of the loss and permeability measurement gauge 13 may be excited from 120 volts, 60 hertz power through the media of a ring modulator 109, filter circuit 32, operational amplifier 33, voltage mixer 34, and power amplifier 35. In that loss is to be measured at a definite level of flux density (assume 15 kilogauss) the flux induced in the moving strip 11, as reflected by the voltage 28 generated in the second pickup coil 9 of the second measurement gauge 13, must track the cross sectional area of the strip. This is accomplished by rectifying voltage 28 through rectifier 30, after the voltage 28 passes through the output of a fixed gain buffer amplifier 31 and comparing this DC output voltage designated as second signal 10 to a second input of differential amplifier 26. The utilization of voltage 28 after its passage through buffer amplifier 31 through the input of rectifier 30 toward the second input of differential amplifier 26 forming second signal 10 is considered to be the first effect of the voltage 28. At differential amplifier 26 the first signal 18 is compared with the first effect of the rectified voltage 28 or second signal 10. Thus the differential amplifier 26 forms comparator means by comparing the first signal 18 after the first signal 18 has been delayed by delaying means, that is the rotary make before break switch 20, with the second signal 10 to determine any difference between the first signal 18 and the second signal 10. The differential output of the differential amplifier 26 controls the output of the ring modulator 109 and through a filter circuit 32, operational amplifier 33, and voltage mixer 34, controls the output of the power amplifier 35. This automatically adjusts the amplitude of the alternating current that energizes the magnetizing coil 27 in the second measurement gauge 13 as necessary to hold a substantially constant ratio of flux to area, which ratio corresponds to a flux density of 15 kilogauss in the center of the section of the strip of steel 11, moving through the second measuring gauge 13. The magnitude of voltage 28 then varies in proportion to the changes in thickness of the strip passing through the second measurement gauge 13.

To allow the second measurement gauge 13 to operate as a loss and permeability measurement gauge, the gauge parameters and the weight of the section of steel under the center or measurement portion of the second measurement gauge 13 must be factored in. This will allow the measurement of loss in terms of watts per pound. $P'$ (watts per pound) $= E_B E_H \cos\theta/KT$, where K is a constant. The thickness, T, represents the effect of weight since weight $= dWLT$; where $d=$ density, $W=$width, and $L=$length, of the center section being measured. Therefore, T is proportional to the weight of the length of the strip being measured by the gauge 13 so long as both density and width of the strip remain substantially constant. The output voltage of the buffer amplifier 31, which has a fixed gain, is modified by feeding it through an operational amplifier 36 having a continuously adjustable gain of $1/T$ controlled by the electronic gain circuit EGC 37. To control the gain of the operational amplifier 36, the output of the operational amplifier is rectified through rectifier 38 and compared to the first signal 18, supplied by the first measurement gauge 12, at differential amplifier 39. The differential output of differential amplifier 39 is connected to the electronic gain circuit 37 which continuously adjust the gain of the operational amplifier 36 to equal $1/T$, normalizing the AC output of the operational amplifier 36 to a constant voltage level. This normalized voltage 40 ($E_E$) feeds the voltage channel of a power transducer 41. Thus, the voltage normalizing means in this embodiment comprises operational amplifier 36, electronic gain circuit 37, rectifier 38, and differential amplifier 39. The cooperation between the voltage 28 and the voltage normalizing means is the second effect of the voltage 28.

The voltage or third signal 29 obtained from the gauge 13 is fed through a buffer amplifier and electronic integrator 42 having unity gain to provide a voltage 43 ($E_I$) that is fed into the current channel of the power transducer 41. In this embodiment, the buffer amplifier and electronic integrator 42 forms current normalizing means. The power transducer 41 is suitably constructed and arranged to produce an output voltage proportional to the vector product of the voltages 43 and 40 (i.e., $E_E E_I \cos\theta$, where $E_I$ represents the current (I) energizing the magnetizing coil 27, $E_E$ represents the ratio of the flux voltage $E_B$ to weight, and $\theta$ is the phase angle between these quantities). As is well known to persons skilled in the art, this output is an indication of power loss ($P'$) per unit area in the section of the strip passing through the measuring gauge 13. In other words, $P' = E_B I \cos\theta/\text{weight}$. The transfer characteristics and other parameters of the various parts previously described are appropriately selected so that the voltage magnitude of the output of the transducer 41 is calibrated in watts per pound. For example, an output of 0.5 volts represents a loss in the steel strip 11 at the center of the second measuring gauge 13 of 0.5 watts per pound. The output of the power transducer 41 may drive indicating means such as a strip chart recorder 54 to provide a continuous plot of watts per pound.

A DC digital voltmeter (not shown) may be connected in parallel with the chart recorder 54 through a selector switch contact (also not shown) to provide an instantaneous readout of watts per pound.

Figure 4:
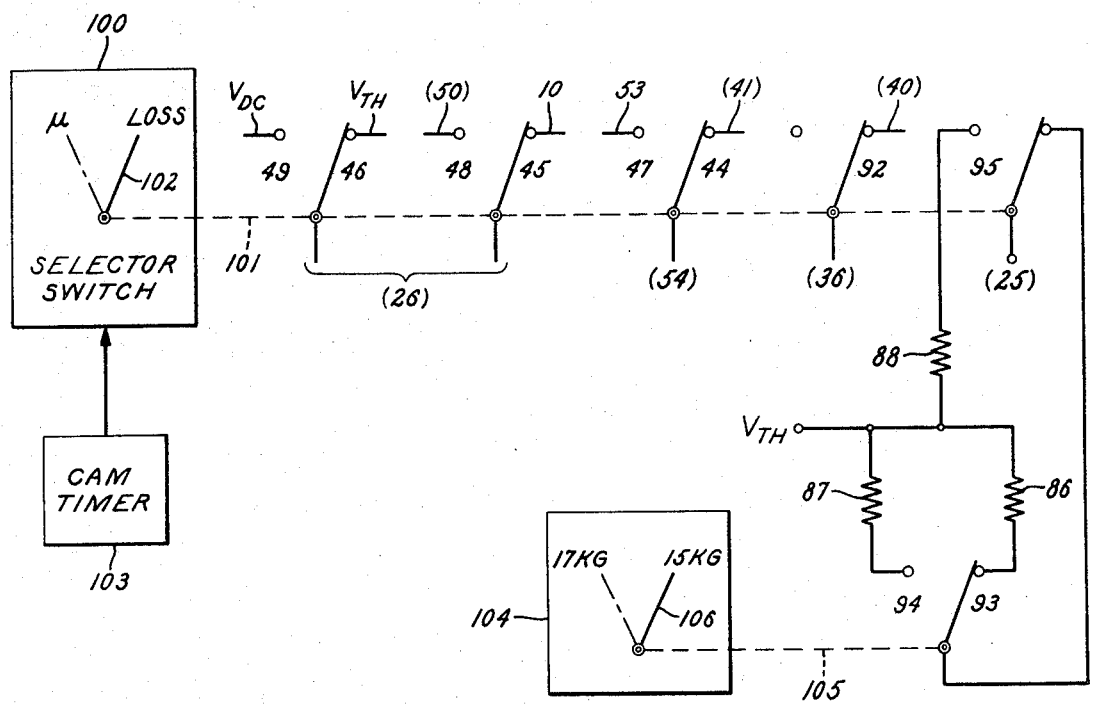
FIG. 4 is a schematic representation of the switch contacts shown in FIGS. 1 and 3.

FIG. 1 also shows that when measuring loss in this system, switch contacts 44, 45, and 46 are normally closed. To allow for a continuous measure of permeability normally closed contacts 44, 45, and 46 are opened and normally open contacts 47, 48, and 49 are closed. These contacts are part of a selector switch or relay means which can be constructed in a known manner to switch the contacts from one position to another in response to a manual or automatic command. By way of example, there is illustrated in FIG. 4 a selector switch 100 comprising a shaft 101 which is turned by a handle 102 between two alternative positions: a first position in which the switch contacts are set up appropriately for a permeability measurement, and a second position in which they are set up for a loss measurement. The respective contacts 44-49 are keyed to the shaft 101 for actuation thereby, as is indicated in FIG. 4. If measurement of both loss and permeability is desired, a cam timer 103 may be employed to periodically operate the switch 100 from one position to the other, whereby a sequential plotting of both permeability and watts per pound is provided.

PERMEABILITY MEASUREMENT

As in the measurement of loss, the second magnetizing means, coil 27 of the second measuring gauge 13 may be excited from 120 volt, 60 hertz power through the media of a ring modulator 109, filter circuit 32, operational amplifier 33, voltage mixer 34, and power amplifier 35 as shown at the right-hand side of FIG. 1. The voltage or third signal 29 induced in an H coil (not shown) of the second measuring gauge 13 is fed through the buffer amplifier and electronic integrator 42 and through a peak voltage transducer 50. The DC voltage at the output of this peak voltage transducer 50 represents peak excitation or field strength in the center of the second measuring gauge 13. This DC voltage output is fed through the now-closed switch contact 48 (switch contacts 44, 45, and 46 being open) to the second input of the differential amplifier 26 where this DC voltage is compared to a constant DC reference voltage of given magnitude, which is supplied by a suitable source 51 through a closed contact 49 to a first input of the amplifier 26, representing a field strength level of, as an example, 10H (10 oersteds). The differential output of differential amplifier 26 controls the output of the ring modulator 109, and through the filter circuit 32, operational amplifier 33, voltage mixer 34, controls the output of the power amplifier 35. This automatically adjusts the amplitude of the current energizing the magnetizing coil 27 as necessary to hold the excitation in the center of the second measurement gauge 13 at 10H (10 oersteds).

The output of the second pickup means or developed voltage 28 in the second measuring gauge 13 is fed through the buffer amplifier 31 which has a fixed gain of 1/K to factor in the gauge constant. The amplitude of the voltage output of the buffer amplifier 31 is consequently a measure of the amount of flux in the section of the steel strip passing through the gauge 13 when excited at a field strength level of 10H (10 oersteds). This output voltage is modified by feeding it through the operational amplifier 36 having a continuously adjustable gain of 1/T controlled by the electronic gain circuit EGC 37 wherein T is the thickness of the strip 11. To control the gain of the operational amplifier 36, its output is rectified in a rectifier 38 and compared to a DC reference voltage or first signal $V_{TH}$ supplied by the first measuring gauge 12 and delayed through the rotary make-before-break switch 20 by means of the differential amplifier 39. The differential output of the differential amplifier 39 drives the electronic gain circuit EGC 37 which continuously adjusts the gain of the operational amplifier to 1/T. The DC voltage output of the rectifier 38 is voltage 53 which represents the flux density in the steel strip 11 at 10H or $\mu$, since $\mu = B/10H$. If the steel strip 11 has perfectly uniform magnetic characteristics, then voltage 53 would remain constant regardless of changes in thickness, since the flux density in a 10 mil strip would be constant. For example, 1.830 volts might be chosen for voltage 53 to represent a permeability of 1,830 at 10H for the most desirable quality core steel.

The output voltage 53 drives the strip chart recorder 54 through closed contact 47 to provide a continuous plot of permeability. A DC digital voltmeter (not shown) may be connected in parallel with the chart recorder 54 through a selector switch contact (not shown) to provide an instantaneous readout of permeability.

THICKNESS MEASUREMENT

A continuous plot of steel thickness can be obtained by feeding the output voltage or first signal 18 from the first measurement gauge 12 through a high input impedance emitter-follower (not shown) to drive a second chart recorder (also not shown). A DC digital voltmeter connected in parallel with this strip chart recorder will provide an instantaneous readout of the thickness of the steel strip 11.

HARMONIC SUPPRESSION

To obtain a precise measurement of loss and permeability, the voltage 28 induced in the voltage pickup coil 9 of the second measurement gauge 13 should be a pure sine wave. Consequently, some type of harmonic suppression circuit may be required to keep the harmonic content of voltage 28 to a negligible level.

The voltage 28 is fed back through a harmonic suppression network 52 to the voltage mixer 34 in the excitation circuit as shown in FIG. 1. This harmonic suppression network 52 will automatically control the harmonics in the second magnetizing means 27 of the second measurement gauge 13 to maintain a reasonable sine wave of voltage 28 at the output of the second voltage pickup winding (not shown).

Figure 2:
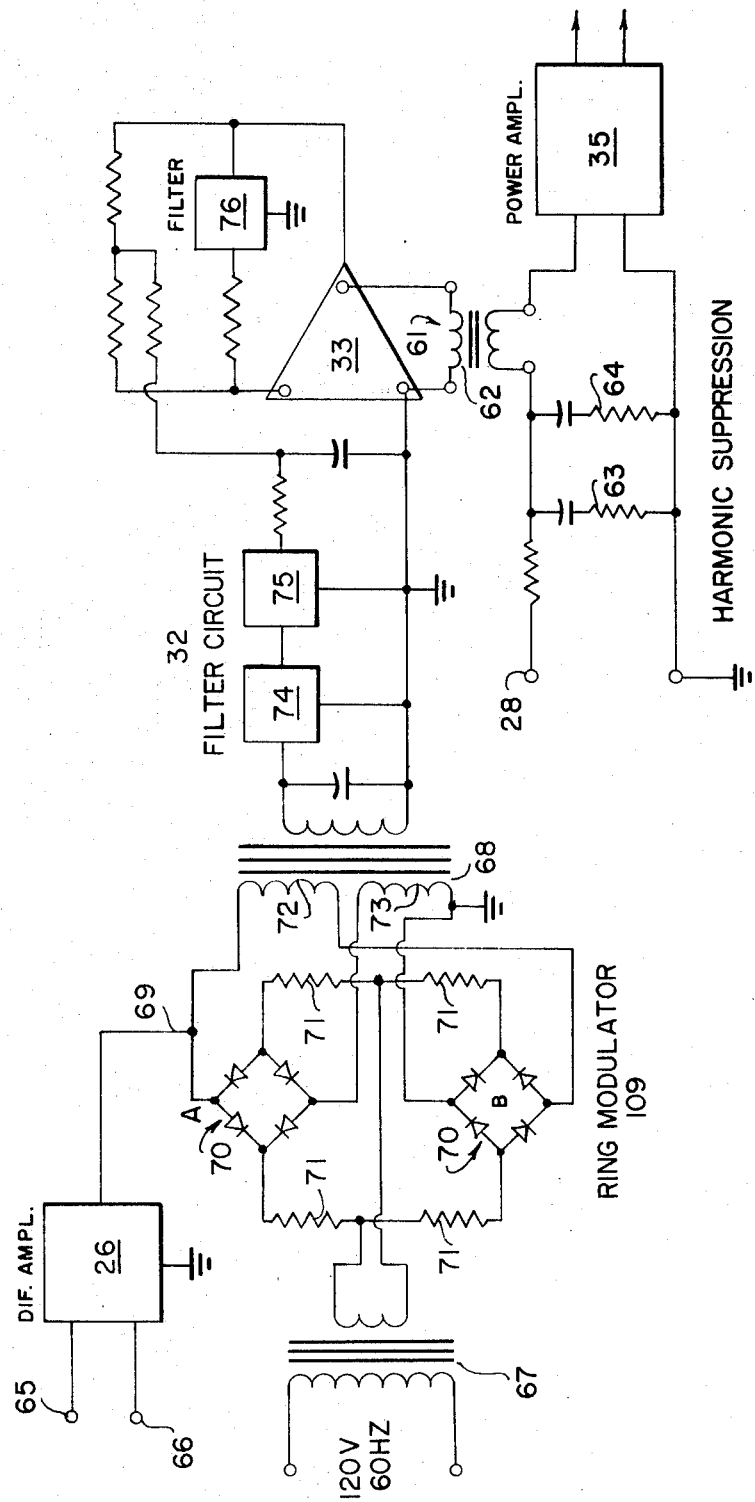
FIG. 2 is the schematic representation of the excitation control and harmonic suppression circuit of the continuous steel strip tester.

Referring to FIG. 2, the actual harmonic suppression circuit is shown in the lower right-hand corner of FIG. 2. In general, this is a "brute force" method of harmonic suppression. The voltage 28 induced in the pickup coil 9 of the second measuring gauge 13 is fed back in series opposition to the fundamental voltage 61 provided to drive the power amplifier 35 that excites the second magnetizing means 27 of the second measurement gauge 13 by means of the voltage mixer 34, or transformer 62. The windings of transformer 62 are connected in the proper polarity so that the fundamental component of voltage 28 is cancelled out by fundamental voltage 61, thus allowing the unwanted harmonics in voltage 28 to be fed back through the power amplifier 35 to the second magnetizing means 27 of the second measuring gauge 13. The amount of feedback and harmonic cancellation is determined by the circuit parameters and by the ratio in the voltage mixer 34 or transformer 62. The two RC shunt networks 63 and 64 are selected to obtain the proper frequency rolloff to prevent oscillation at the low and high ends of the frequency range involved.

EXCITATION CONTROL

Referring to FIG. 1 and FIG. 2, the excitation control circuit automatically holds the voltage 28 to the desired level by comparing a DC control voltage 65 derived from voltage 28 or voltage 29 to a DC voltage reference 66 derived from first signal 18 or DC reference voltage 51, and using the difference voltage at the output of differential amplifier 26, to control the voltage input to the power amplifier 35, through the media of a diode ring modulator 109, filter circuit 32, operational amplifier 33 and transformer 62.

The main excitation voltage may be obtained directly from a 120 volt 60 hertz line which is fed to the diode ring modulator 109 through an impedance matching transformer 67. The ring modulator 109 delivers a square wave type of voltage at the output of transformer 68 having an amplitude proportional to the DC control voltage 69, the control voltage 69 being the difference between the control voltage 65 and reference voltage 66.

The diode ring modulator 109 comprises two bridges A and B of diodes 70 and for resistors 71, for example, 5,000 ohms, properly matched, with a reference voltage such as 120 volts 60 hertz being applied to the primary of the input transformer 67, current will circulate through part of the diodes 70, the resistors 71 and the secondary of the input transformer 67. During each half cycle of one polarity of the reference voltage, the bridge A is turned on (i.e., all of its diodes are conducting), and during each of the alternate half cycles of the opposite polarity, the bridge B is turned on. While bridge A is on, the DC bias or control voltage 69 is impressed directly across a primary winding 73 of the output transformer 68, and while bridge B is on, the same voltage is impressed directly across an oppositely poled primary winding 72 of this transformer. Consequently, a square wave of current will flow in the primary windings 72 and 73 of the output transformer 68 and a square wave of voltage will appear across the output winding of transformer 68 or, at the output of the ring modulator. The amplitude of this voltage will be proportional to the DC control voltage and its frequency will be the same as the frequency of the voltage applied to the input winding of transformer 67.

Since the output of the ring modulator is a square wave, the harmonic component must be suppressed by filtering to provide a sine wave of voltage 61 at the output of the operational amplifier 33. This filter circuit is comprised of two twin tee type filter networks 74 and 75 connected in tandem between the output of the ring modulator 109 and the input of the operational amplifier 33. These two filter networks are tuned to 300 hertz and 180 hertz respectively to suppress the major harmonics involved in magnetic testing at 60 hertz. A third twin tee filter 76, tuned to the fundamental frequency of 60 hertz, is inserted in the feedback circuit of the operational amplifier 33 to suppress all the residual harmonics at the input of the operational amplifier 33 and provide a sine wave voltage 61 at the output of operational amplifier 33 to excite the second magnetizing means 27 of the second measurement gauge 13 through the media of transformer 62 and the power amplifier 35.

The transformer 62 is designed to provide the proper impedance match and voltage ratio to obtain the desired excitation in the second magnetizing winding 27 and optimum harmonic suppression.

THICKNESS COMPENSATION

Figure 3:
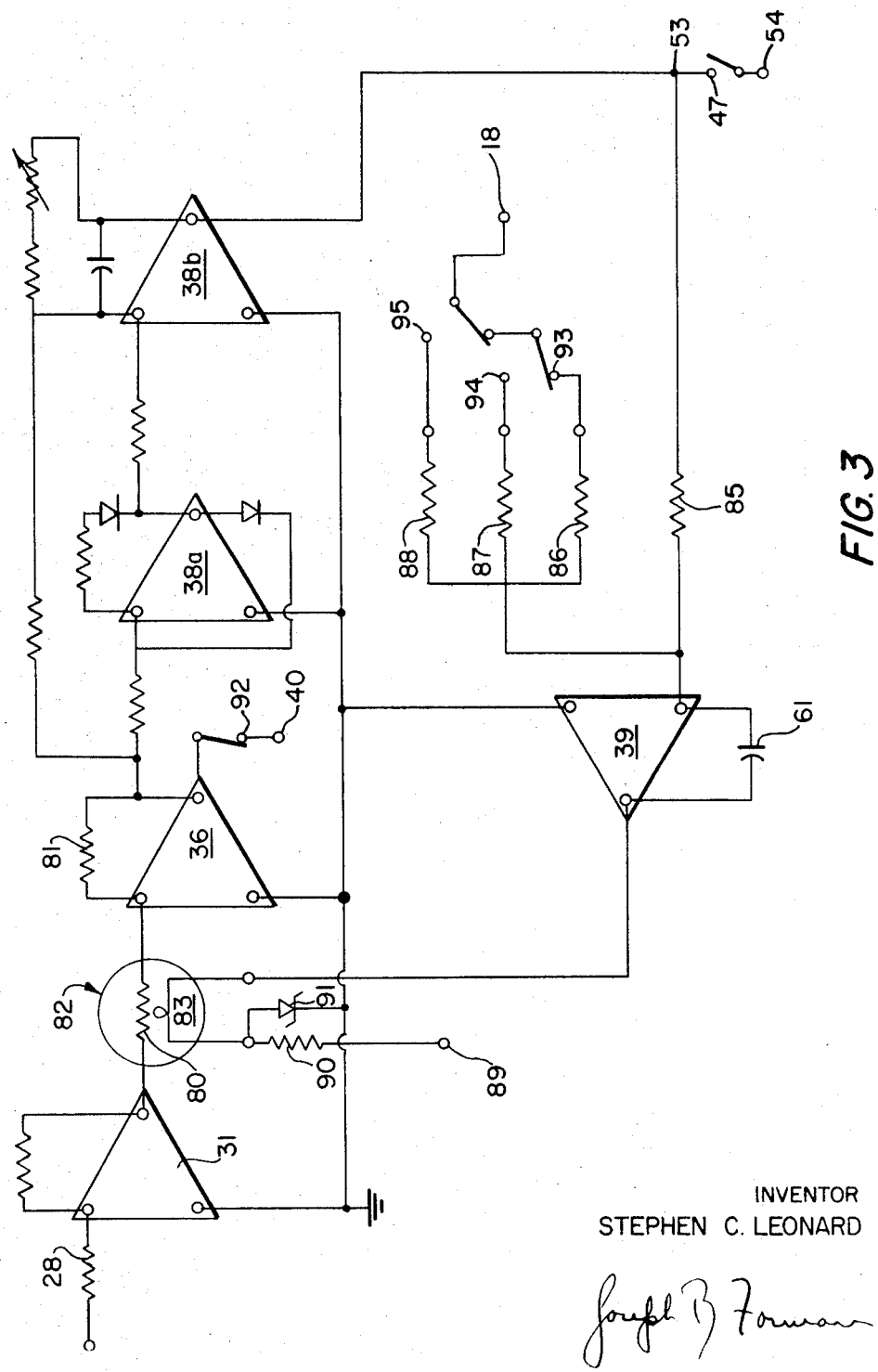
FIG. 3 is the schematic representation of thickness compensation means utilized in the continuous steel strip tester.

Referring now to FIG. 3, the circuit for compensating for the variations of thickness in the continuously moving strip 11 is illustrated. A photocell 80 is used, as the input resistor of the operational amplifier 36. Since the gain of any operational amplifier is equal to the ratio of the feedback resistance 81 here 200K ohms to the input resistor, the photocell 80 used as an input resistor is always proportional to the thickness of the strip of steel 11, and will result in a gain G that is inversely proportional to the thickness or $G = 1/T$. A photomodule generally designated 82 is represented by the block marked EGC 37 in FIG. 1. A photomodule 82 is a small photocell 80 and lamp 83 encapsulated in a small cylindrical light tight housing.

As shown both in FIG. 1 and FIG. 3, the voltage output 28 from the second measurement gauge 13 is fed through a buffer amplifier 31 having a fixed gain of 1/K. The output of the buffer amplifier 31 is fed through the photocell 80 portion of the photomodule 82 (EGC 37 in FIG. 1) to the input of operational amplifier 36. The output of the operational amplifier 36 is fed through the rectifier designated as 38a and 38b in FIG. 3 and as 38 in FIG. 1 to provide a DC control voltage that is fed through a 10k resistance 85, to the input of the differential amplifier 39. A DC reference voltage, that is first signal 18 from the first measurement gauge 12 and delayed through the rotary make-before-break switch 20 (see FIG. 1) is also fed through a 67K ohm resistor 86, 89.2K ohm resistor 87, or a 40.2K ohm resistor 88, to an input of differential amplifier 39. The magnitude of the signal thus supplied to this input will be directly proportional to the cross-sectional area of the section of the strip passing through the gauge 13, with the proportionality constant between this magnitude and the area being changeable by operation of the contacts 93, 94, and 95 which are respectively associated with the resistors 86, 87, and 88. The differential voltage at the output of differential amplifier 39 is fed to one terminal of the lamp in the photomodule 82. The other terminal of the lamp is connected to a constant DC reference voltage 89 of −15 volts through a 110 ohm dropping resistor 90. The voltage level at this terminal of the lamp is held at an optimum reference by a zener diode 91.

The voltage levels and polarities of the control voltage from the rectifier 38 and the reference voltage, first signal $V_{TH}$, are chosen so that as the thickness of the steel strip 11 increases (first signal increases), the current in the lamp 83 of the photomodule 82 decreases. Its light output then decreases and the resistance of the photocell 80 increases. The gain of the operational amplifier 36 then decreases since its gain is proportional to the feedback resistor 81 divided by input photocell 80. Likewise, if the steel thickness decreases, the first signal $V_{TH}$ decreases and the gain of the operational amplifier 36 increases. Thus, the gain of the operational amplifier 36 is always inversely proportional to the thickness, cross-sectional area, or weight of the section of steel being measured.

When contacts 92 and 93 or 94 are closed, the output of the operational amplifier 36, that is voltage 40, is inversely proportional to the weight of the section of steel being measured and allows the loss in watts per pound to be measured by the power transducer 41 shown in FIG. 1 at either a flux density of 15 or 17 kilogauss. The choice of these flux densities depends on the positions of the contacts 93 and 94 which are suitably controlled by a switch such as the one illustrated at 104 in FIG. 4. The switch 104 is seen to comprise a shaft 105 turned by a handle 106 and having keyed thereto the contacts 93 and 94 which in turn are effective whenever the contact 95 is open. As is shown in FIG. 4, the selector switch 100 is arranged to open contact 95 and to close contact 92 whenever loss is being measured. Alternatively, when permeability is being measured, contact 92 is opened and contacts 95 and 47 are closed and, the output voltage 53 of rectifier 38, indicating the permeability of the steel strip at 10 H (10 oersteds), is supplied to the recorder 54.

The details of the rectifier circuit are shown in FIG. 3. This circuit was adapted from a basic rectifier circuit given in the Applications Manual for Computer Amplifiers (page 59) published by Philbrick Researchers, Inc., in 1966.

The peak voltage transducer 50 indicated in FIG. 1 is an adaptation of the precision peak reader and memory given in the Applications Manual for Computer Amplifiers (page 88) published by Philbrick Researchers, Inc., in 1966.

The power transducer 41 indicated in FIG. 1 is based on the use of a solid state Hall device or voltage multiplier as the sensing element in conjunction with operational amplifiers.

While various views of the invention have been shown and described, it will be apparent to those skilled in the art that many modifications are possible without departing from the inventive concept herein disclosed. The invention, therefore, is not to be restricted except as is necessary by the prior art and by the spirit of the appended claims.

What is claimed as new and desired to be secured by Letters Patent of the United States is:

1. In apparatus for continuously testing a moving strip having magnetic properties while the strip moves through a measuring gauge which is equipped with magnetizing means for inducing flux in the section of the strip passing through the gauge and pick-up means for generating a first voltage representative of the amount of flux in said section, the improvement comprising:

a. means for energizing said magnetizing means with alternating current of constant frequency and controllable amplitude;
   b. means associated with said gauge for deriving a second voltage representative of the field strength therein;
   c. first comparison means responsive to the difference between the peak magnitude of said second voltage and a given reference magnitude and operative to control said energizing means so as to adjust said current amplitude as necessary to hold said field strength at a substantially constant level determined by said reference magnitude;
   d. reference means for providing a first signal whose magnitude is directly proportional to the cross sectional area of said section of said strip;
   e. means connected to said pick-up means and to said reference means for producing a normalized alternating voltage whose amplitude varies directly with said first voltage and inversely with said first signal, whereby said normalized voltage is representative of the actual flux density in said section of said strip, said normalized voltage producing means including
      i. an amplifier having continuously adjustable gain for amplifying said first voltage, and
      ii. means for controlling said gain as a function of said first signal so that gain varies inversely with said cross-sectional area;
   f. indicating means; and
   g. means responsive to said normalized voltage and connected to said indicating means for supplying thereto a signal proportional to the amplitude of said normalized voltage which is an indication of the permeability of said section of said strip.

2. The improvement of claim 1 wherein said measuring gauge also has an "H" coil and said means for deriving said second voltage comprises means for integrating the voltage generated by said "H" coil.

3. The improvement of claim 1 wherein said gain-controlling means is responsive to the magnitude difference between said first signal and a feedback signal derived from said normalized voltage.

4. The improvement of claim 1 further comprising: second comparison means responsive to the difference between the magnitude of said first signal and the amplitude of said first voltage and operative to control said energizing means so as to adjust said current amplitude as necessary to hold a substantially constant flux density in said section of said strip; means connected to both said second voltage deriving means and said normalized voltage producing means for producing an output signal proportional to the vector product of said second voltage and said normalized voltage; means for interconnecting said output signal producing means and said indicating means which is thereby supplied with said output signal which indicates power loss per unit area in said section of said strip; and a selector switch having first and second positions and including a plurality of switching contacts respectively arranged a. for effectuating alternative operation of said first and second comparison means, said first comparison means being operative only when said selector switch is in its first position and said second comparison means being operative only when said selector switch is in its second position, and b. for effectuating alternative connection of said indicating means to either said normalized voltage responsive means or said output signal producing means, said indicating means being connected to said normalized voltage responsive means only when said selector switch is in its first position and to said output signal producing means only when said selector switch is in its second position.

5. The improvement of claim 4 wherein said selector switch includes additional means for changing the proportionality constant between said first signal and said cross-sectional area when said switch is in its first position compared to the proportionality constant between these quantities when said switch is in its second position.

6. In apparatus for continuously testing a moving strip having magnetic properties while the strip moves through a gauge which is arranged alternatively to measure either permeability or loss, said gauge being equipped with magnetizing means for inducing flux in the section of the strip passing through the gauge and pick-up means for generating a first voltage representative of the amount of flux in said section, the improvement comprising:

a. means for energizing said magnetizing means with alternating current of constant frequency and controllable amplitude;

b. means associated with said gauge for deriving a second voltage representative of the field strength therein;

c. reference means for providing a first signal whose magnitude is directly proportional to the cross sectional area of said section of said strip;

d. selector switch means having first and second positions;

e. first comparison means responsive to the difference between the peak magnitude of said second voltage and a given reference magnitude and operative when said switch means is in said first position to control said energizing means so as to adjust said current amplitude as necessary to hold said field strength at a substantially constant level determined by said reference magnitude;

f. second comparison means responsive to the difference between the magnitude of said first signal and the amplitude of said first voltage and operative when said switch means is in said second position to control said energizing means so as to adjust said current amplitude as necessary to hold a substantially constant flux density in said section of said strip;

g. means connected to said pick-up means and to said reference means for producing a normalized alternating voltage whose amplitude varies directly with said first voltage and inversely with said first signal, whereby said normalized voltage is representative of the actual flux density in said section of said strip;

h. indicating means;

i. means connected to said normalized voltage producing means and operative when said switch means is in said first position for supplying said indicating means with a signal proportional to the amplitude of said normalized voltage which is an indication of the permeability of said section of said strip; and j. means connected to both said second-voltage-deriving means and said normalized voltage producing means and operative when said selector switch is in said second position for producing an output signal proportional to the vector product of said second voltage and said normalized voltage and for supplying said output signal to said indicating means, said output signal being an indication of the power loss per unit area in said section of said strip.

7. The improvement of claim 6 wherein said gauge also has an "H" coil and said means for deriving said second voltage comprises means for integrating the voltage generated by said "H" coil.

* * * * *